US006873483B2

(12) United States Patent
Hetzler et al.

(10) Patent No.: US 6,873,483 B2
(45) Date of Patent: Mar. 29, 2005

(54) DISK DRIVE WITH SERVO SYNCHRONOUS RECORDING

(75) Inventors: Steven R. Hetzler, Los Altos, CA (US); William John Kabelac, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 492 days.

(21) Appl. No.: 10/072,406

(22) Filed: Feb. 7, 2002

(65) Prior Publication Data

US 2003/0147166 A1 Aug. 7, 2003

(51) Int. Cl.$^7$ ................................................. G11B 5/09
(52) U.S. Cl. ....................................... 360/51; 360/77.08
(58) Field of Search ............................. 360/51, 75, 46, 360/77.08; 369/44.13, 44.34

(56) References Cited

U.S. PATENT DOCUMENTS

| | | | | |
|---|---|---|---|---|
| 4,894,734 A | * | 1/1990 | Fischler et al. | 360/51 |
| 5,206,847 A | * | 4/1993 | Kanda | 369/44.13 |
| 5,253,131 A | * | 10/1993 | Chevalier | 360/78.14 |
| 5,535,067 A | | 7/1996 | Rooke | |
| 6,049,438 A | * | 4/2000 | Serrano et al. | 360/49 |
| 6,104,563 A | * | 8/2000 | Dovek et al. | 360/66 |
| 2003/0043710 A1 | * | 3/2003 | Shelton et al. | 369/44.34 |

OTHER PUBLICATIONS

J.R. Pollock, "Method to Overcome the Problems of using Fixed Frequency Oscillator to Write Variable Length Data on DASD", IBM Technical Disclosure Bulletin, vol. 38, No. 4, Apr. 1995, 283.

H. Yada, Clock Jitter in a Servo–Derived Clocking Scheme for Magnetic Disk Drives, IEEE Transactions on Magnetics, vol. 32, No. 4, Jul. 1996, 3283–3290.

H. Yada, et al., "External Clocking PRML Magnetic Recording Channel for Discrete Track Media", IEEE Trans. Fundamentals, vol. E76–A, No. 7, Jul. 1993, 1164–1166.

* cited by examiner

*Primary Examiner*—Sinh Tran
*Assistant Examiner*—Dan I Davidson
(74) *Attorney, Agent, or Firm*—Thomas R. Berthold (57) ABSTRACT

A read clock circuit for a disk drive includes a phase-locked loop/voltage controlled oscillator (VFO/PLL) and a frequency synthesizer. The VFO/PLL receives a servo sector transition signal that is related to detected transitions in a servo sector field of a magnetic recording disk, and outputs a servo frequency signal that is synchronous to the servo sector transition signal. The frequency synthesizer receives the servo frequency signal and generates the read clock signal that is synchronous with the servo frequency signal. In a banded recording disk drive the frequency synthesizer generates a unique read clock signal for each data band.

12 Claims, 6 Drawing Sheets

FIGURE 1

*PRIOR ART*

DISK DRIVE WITH SERVO SYNCHRONOUS RECORDING

FIELD OF THE INVENTION

This invention relates to disk drives, and more particularly to a system and method for generating read and write clock signals for a magnetic recording disk drive that results in improved format efficiency, performance, and tolerance to read errors.

BACKGROUND OF THE INVENTION

Figure 1:
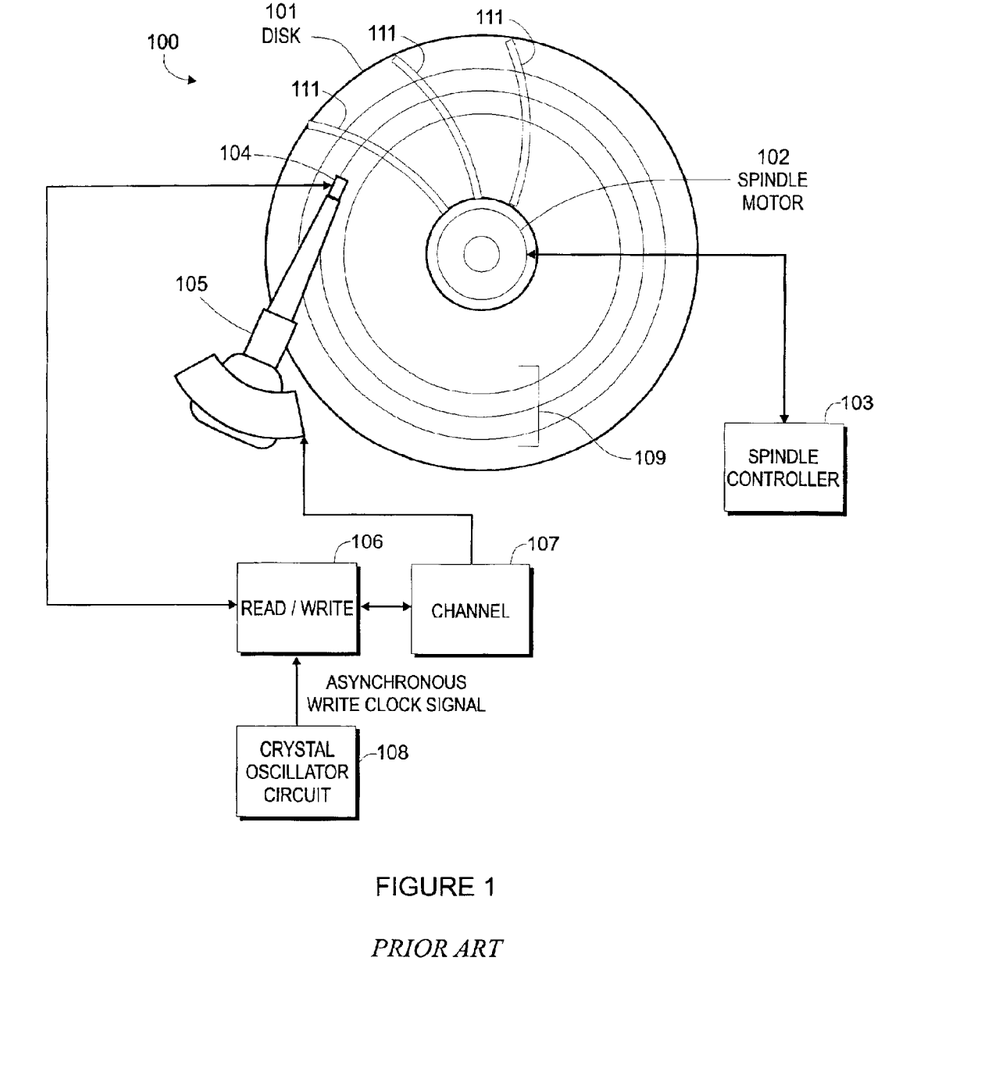
FIG. 1 is a functional block diagram of a prior art disk drive having a conventional crystal oscillator circuit that provides an asynchronous write clock.

FIG. 1 is a functional block diagram of a conventional disk drive 100 having a crystal oscillator circuit 108 that provides an asynchronous write clock. Disk drive 100 includes a disk 101, a spindle motor 102 for rotating the disk, a spindle controller 103, a head 104 for reading or writing, an actuator 105 for moving the head across the disk, read/write and servo processing circuit 106, a data channel 107, and an oscillator circuit 108. Disk drive 100 is typically a banded recording or zoned bit recording (ZBR) disk drive with a sector servo architecture, as shown by disk 101 with annular data bands 109 and equally angularly spaced servo sectors, such as typical servo sectors 111, extending across the data bands. In ZBR the data tracks are grouped into zones or annular bands based on their distance from the center of the disk, and each zone is assigned a number of data sectors per track. This allows for more efficient use of the larger tracks on the outside of the disk. Data is read and written at a fixed frequency within a band, but the read and write frequency varies from band to band. This is because the outer bands contain more data, but the angular velocity of the disk is constant regardless of which band or which track in a band is being read from or written to.

Crystal oscillator circuit 108 derives the write clock frequency used for disk drive 100 from a frequency synthesizer that has an input reference clock signal having a fixed crystal frequency and is adjustable for different data bands 109 on disk 101. To read information from disk 101, a read reference clock is locked to the recorded transition spacing in a data preamble field stored on disk 101. When the read reference clock has locked to the preamble transition spacing, user data bits that follow are synchronized with the reference clock. The reference clock and synchronized data are then applied to the channel data decoder (not shown) of channel 107.

Because the data preamble field controls the read clock, user data may only be read back when the data preamble field has not been corrupted. An error correcting code (ECC) only protects data when synchronization has been achieved and is maintained for only the data sectors. An ECC does not protect the data preamble. Moreover, synchronization fields add to the data format overhead, thereby reducing disk drive capacity.

IBM's U.S. Pat. No. 5,535,067 discloses a disk drive write clock generator circuit that is synchronized to the rotation of the disk. A relatively low frequency reference signal having short duration pulses, such as a dedicated servo pattern, a sector servo pattern, an index pattern or a spindle pulse, is used for generating a synchronous high-frequency write clock. The high-frequency write clock signal has a predetermined number of cycles for each reference period. A counter coupled to the output of the clock counts the number of clock cycles generated for each reference period and compares the count to an expected number corresponding to a desired clock frequency. When the compared numbers are different, an error signal is generated that is used for adjusting the write signal frequency.

A re-synchronization technique that compensates for the variable speed of a disk motor to thereby remove tolerance buildup at fixed positions around the disk is disclosed by J. R. Pollock, "Method to Overcome the Problems of using Fixed Frequency Oscillator to Write Variable Length Data on DASD", *IBM Technical Disclosure Bulletin*, Vol. 38, No.4, April 1995, 283. According to Pollock, a sector servo system generates a reference signal at each sector that is synchronized to the disk surface and provides an absolute reference signal for restarting a read/write operation, which allows the fixed frequency oscillator to clock the write data. During a write operation, a controller determines the current nominal position of the data being written on the disk. When the controller determines that one of the resynchronization areas is about to be reached, the read/write operation is suspended to space over the re-synchronization gap. The start of the read/write operation is resynchronized to the reference signal, thereby compensating for any accumulated error caused by variation in the speed of the disk. However, the re-synchronization region provides a start indication, not a clock that is synchronous with servo.

A disk drive that uses clock marks in the servo sectors to control the data read and write clock is described by H. Yada, "Clock Jitter in a Servo-Derived Clocking Scheme for Magnetic Disk Drives", *IEEE Transactions on Magnetics*, Vol. 32, No. 4, July 1996, 3283–3290. In that system, no means are provided for altering the read/write data frequency with respect to the clock mark read-back pulse frequency, or for data recovery in the presence of errors in the clock marks.

Nevertheless, what is needed is a system that synchronizes write and read clocks to an independent fixed frequency to avoid data read errors that are caused when the data preamble is corrupted, and that is operable in a banded recording disk drive that use multiple read and write frequencies.

SUMMARY OF THE INVENTION

The present invention provides a system and a method for synchronizing write and read clocks to a predefined servo information bit spacing, thereby avoiding data read errors that are caused when the data preamble is corrupted. Specifically, the present invention synchronizes both the write and read clocks to the written servo information bit spacing within a servo sector of a disk so that written data transitions are correlated with the servo information bit spacing.

By deriving both write and read clocks from the servo information bit spacing, the present invention improves data integrity because a corrupted preamble field caused by, for example, thermal asperities and/or magnetic dropouts, no longer results in loss of data sector information. Data format efficiency is also improved because the data preamble field can be reduced or eliminated, and because tighter timing tolerances can be utilized. Moreover, timing gap size can be reduced, thereby offsetting any adverse impact caused by adding additional servo sectors. Further, the write and read clocks can be re-synched to an abbreviated servo sector field, i.e., a servo sector that has been corrupted. Also, servo fields containing only synchronization information may be interlaced with data information for increased robustness to events that affect clock inaccuracy. Another advantage provided by the present invention is that the disk speed control complexity is reduced, resulting in reduced cost and improved power consumption for a disk drive.

The advantages of the present invention are provided by a read clock circuit for a disk drive that includes a variable frequency oscillator/phase-locked loop (VFO/PLL) and a frequency synthesizer. The VFO/PLL receives a servo sector transition signal that is related to detected information bits in a servo sector field of a magnetic recording disk. In response, the VFO/PLL outputs a servo frequency signal that is synchronous to the servo sector information bit spacing. The frequency synthesizer receives the servo frequency signal and generates the read clock signal at a frequency that is synchronous with the servo frequency signal. In a ZBR disk drive the frequency synthesizer also receives input on the data band being accessed and alters the read clock frequency as a function of the band where data is being read from or written to. The servo sector field from which the servo information bits are detected can be one or more automatic gain control (AGC) fields of the servo sector, one or more position error signal (PES) fields of the servo sector, or a combination of one or more AGC fields and one or more PES fields. According to the invention, the frequency and/or the phase of the read clock signal can be derived from the servo frequency signal. The read clock circuit of the present invention can also generate a read clock signal in the presence of information corruption in a servo sector field.

BRIEF DESCRIPTION OF THE DRAWING

The present invention is illustrated by way of example and not limitation in the accompanying figures in which like reference numerals indicate similar elements and in which.

DETAILED DESCRIPTION OF THE INVENTION

Figure 2:
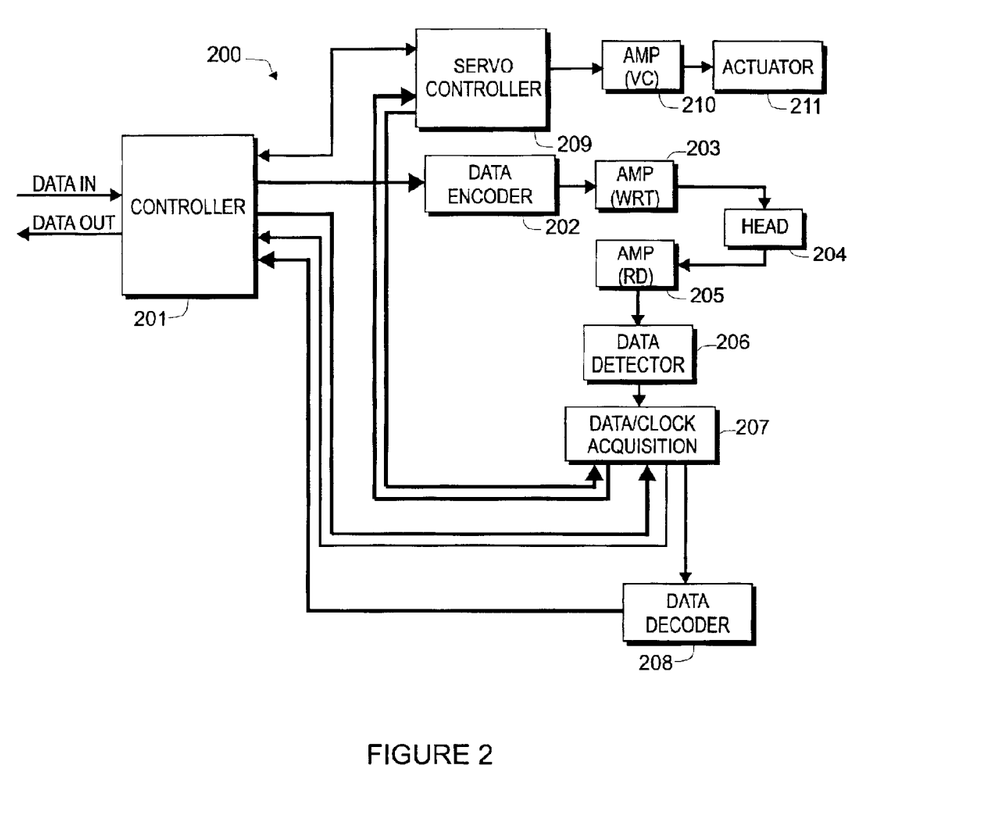
FIG. 2 shows a functional block diagram of a disk drive providing servo synchronous recording according to the present invention.

FIG. 2 shows a functional block diagram of a disk drive 200 providing servo synchronous recording according to the present invention. Disk drive 200 includes a controller 201, a data encoder 202, a write amplifier 203, a read/write head 204, a read amplifier 205, a data detector 206, data/clock acquisition circuitry 207 and a data decoder 208 that together operate in a conventional manner for writing and reading data to a magnetic recording disk (not shown in FIG. 2). Disk drive 200 also includes a servo controller 209, a voice coil (VC) amplifier 210 and an actuator 211. Servo controller 209 and VC amplifier 210 operate in a conventional manner for positioning actuator 211 so that read/write head 204 is positioned above a selected track of the disk.

Figure 4:
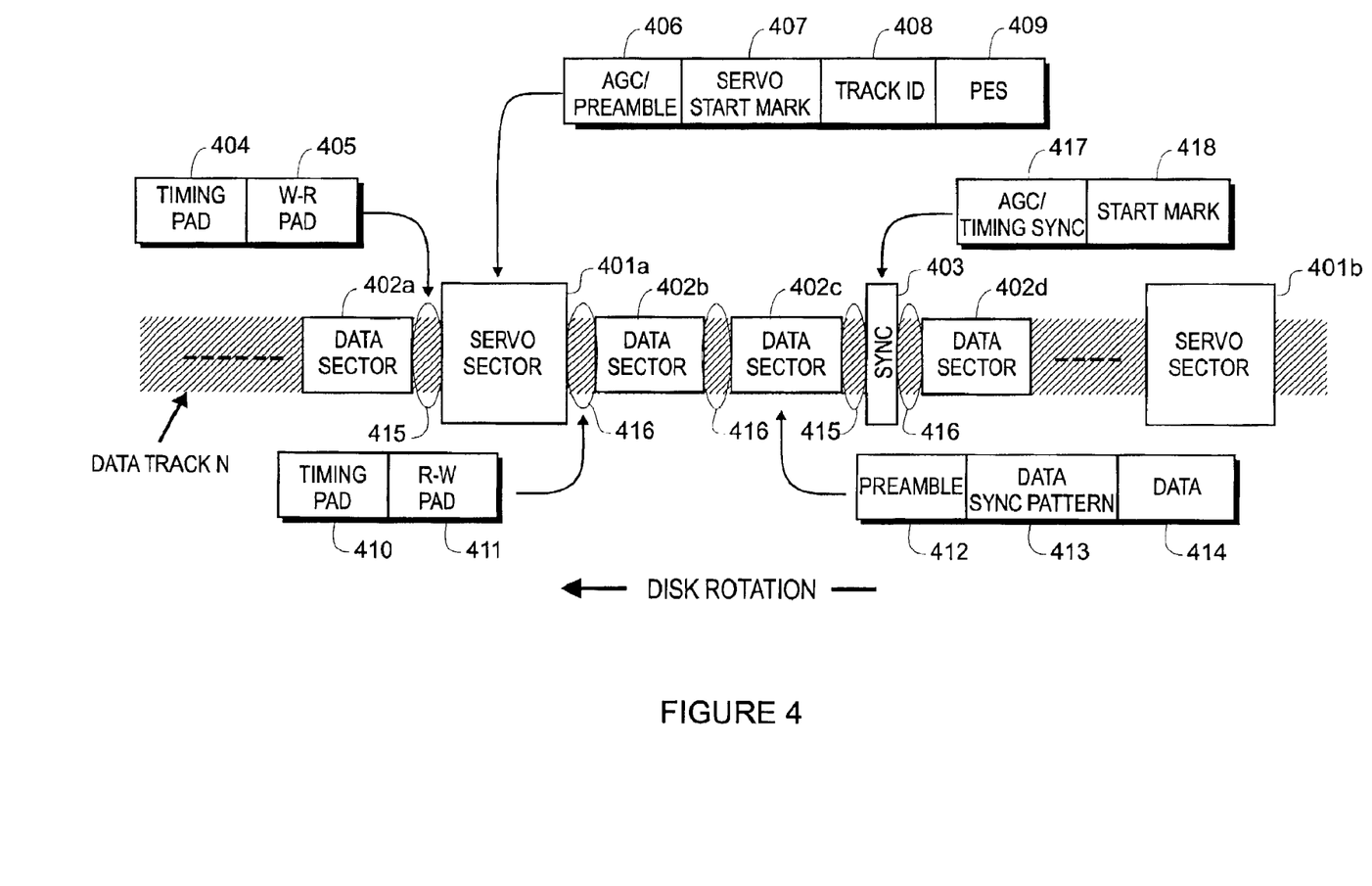
FIG. 4 shows a typical recording track, with detail of data and servo format regions, and optional synchronization regions.

FIG. 4 illustrates a portion of a data track of the disk, including a plurality of data sectors 402 and servo sectors 401. Included within typical servo sector 401a is servo signal gain acquisition (AGC/Preamble) field 406, Servo Start Mark (STM) field 407, Track ID (TID) field 408, and Position Error Signal (PES) field 409. Typical data sector 402c includes preamble field 412, data sync pattern field 413, and data and ECC field 414.

Figure 3:
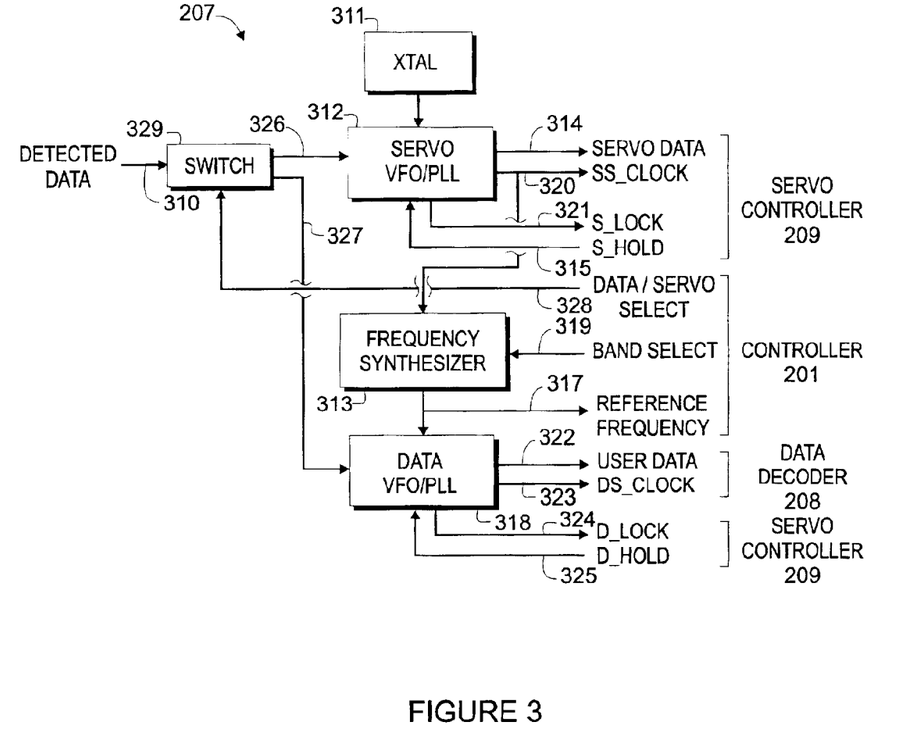
FIG. 3 shows a detailed connection block diagram of electronic components necessary to implement the present invention.

FIG. 3 shows the detail of data/clock acquisition circuitry 207, which includes fixed frequency reference clock 311, servo VFO/PLL 312, frequency synthesizer 313, data VFO/PLL 318, and switch 329.

According to one embodiment of the invention, the timing reference frequency 317 from frequency synthesizer 313 is generated based on a detected signal from AGC field 406 of a servo sector. During AGC field 406, switch 329 connects detected data signal 310 to input 326 of servo VFO/PLL 312. Servo VFO/PLL 312 derives an output clock 320 that is phase locked to input 326.

Servo VFO/PLL 312 locks to the incoming servo information in a well-known manner. Signal S_LOCK 321 is output to servo controller 209 when lock is achieved. In response, signal S_HOLD 315 is returned by servo controller 209, instructing VFO/PLL 312 to hold phase and frequency of signal SS_CLOCK 320. Servo VFO/PLL 312 output signal SS_CLOCK signal 320 is synchronous with the servo information in detected data signal 310. Signal SS_CLOCK 320 is applied to the input of frequency synthesizer 313. The use of signal SS_CLOCK 320 as an input to frequency synthesizer 313 allows frequency synthesizer 313 to generate a reference frequency 317 synchronous with SS_CLOCK 320.

Reference frequency 317 is selected by controller 201 using band select input 319, which identifies the data band being accessed. This allows frequency synthesizer 313 to alter the frequency of data clock 323 independently of the servo clock frequency. Thus even though signal SS_CLOCK 320 input to frequency synthesizer 313 will have the same frequency for all data bands because information in servo sectors is written using the same frequency across all the bands, the reference frequency 317 will vary with band. The following are two examples of how this is accomplished:

EXAMPLE 1

Data band 1 is requested, and the input 320 to the frequency synthesizer 313 is 40 MHz. For this example, information on band select 319 would instruct synthesizer 313 to multiply clock 320 by a factor of 1.1, resulting in an output reference frequency 317 of 44 MHz.

EXAMPLE 2

Data band 2 is requested, and the input 320 to frequency synthesizer 313 is 40 MHz. For this example, information on band select 319 would instruct synthesizer 313 to multiply clock 320 by a factor of 1.15, resulting in an output reference frequency 317 of 46 MHz.

During a data write operation, controller 201 uses reference frequency 317 to clock un-encoded data to data encoder 202. Thus, the data is written synchronous with the servo information 326. During a data read operation, controller 201 sends detected data 310 to input 327 of data VFO/PLL 318 using switch 329. Controller 201 then operates data VFO/PLL 318 in the conventional well-known manner. The exception being that the reference frequency 317 input to the data VFO/PLL is synchronous with the servo information, instead of a fixed frequency input.

Figure 5:
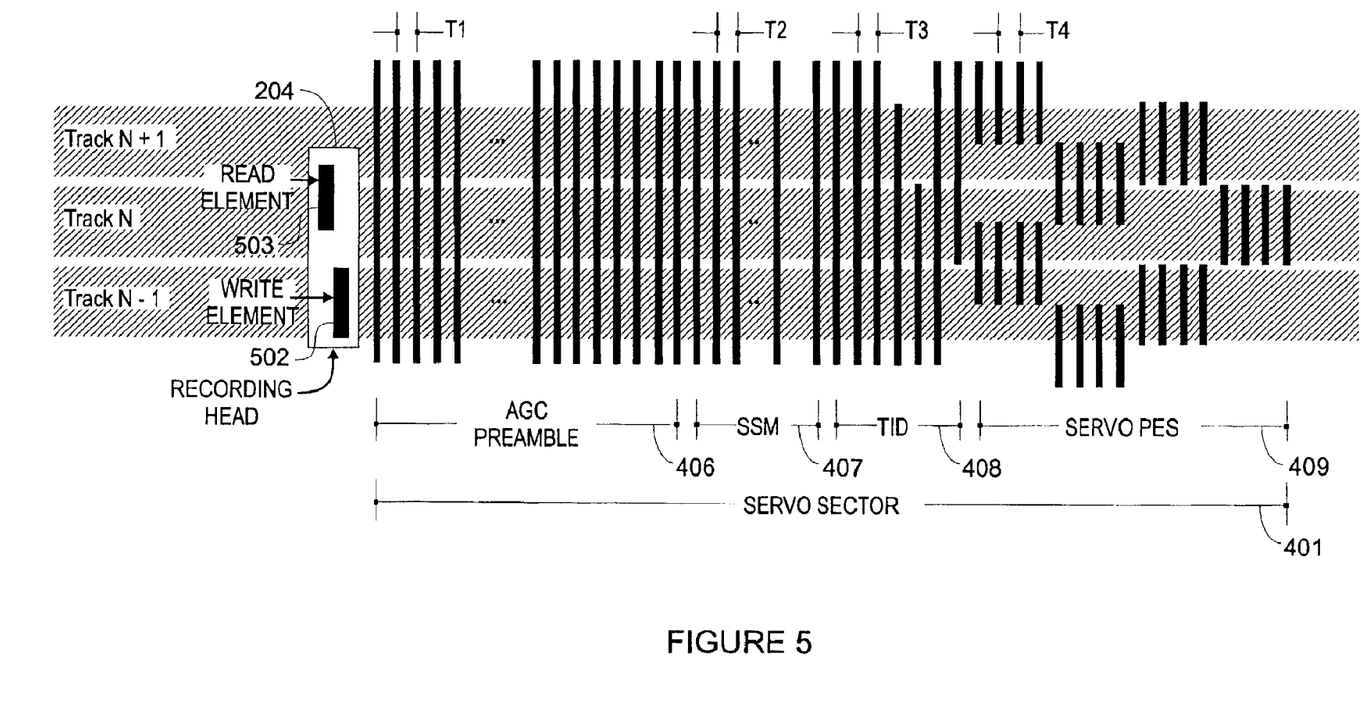
FIG. 5 shows relative servo information bit alignment for a typical servo sector for three adjacent data tracks.

FIG. 5 shows the in-track spacing T1, T2, T3, T4, and the radial or cross-track spacing relationship of servo information bits 406, 407, 408, 409 within servo sector 401, that span data tracks N+1, N, and N−1. Further, FIG. 5 illustrates the relative positions of read element 503 and write element 502, within recording head 204, and the relative position of recording head 204 to servo information bits 406, 407, 408, 409, and data tracks N+1, N, and N−1.

As previously mentioned, servo VFO/PLL 312 locks to incoming servo information. The most desirable servo information for this purpose is contained in the AGC preamble field 406 of the servo sector 401, shown in typical servo sector 401*a*. This field is selected since it typically contains a large number of information bits that are written phase aligned, with uniform bit spacing, in a generally radial alignment across the surface of the disk. This desirable characteristic provides a means for acquiring a common clock when the read element 503 of the recording head 204 is between tracks (shown in FIG. 5), i.e., during track seeks and settles. Further, it provides a mechanism for acquiring a common clock when the read element track center shifts for read and write operations. As shown in FIG. 5, with a dual element head, there is a radial offset between the read element centerline and the write element centerline. It is important that phase and frequency of the reference frequency 317 generated when writing a given data sector are the same when reading that data sector.

As an alternative to the AGC field 406, servo information signal 326 can be generated based on detected data in other fields in the servo sector, ie. PES field 409, or TID field 408. In another alternative embodiment, servo information signal 326 can be generated based on a combination of the AGC and PES fields. In yet other embodiments of the invention, servo information signal 326 can be generated based on multiple AGC fields, multiple PES fields, or a combination of multiple AGC fields and multiple PES fields.

In servo architectures where T1≠T2≠T3≠T4, servo VFO/PLL 312 and frequency synthesizer 313 may derive reference frequency 317 using the bit spacing in a single servo field, i.e., T1, or a combination of bit spacing within a servo sector 401, i.e., T1, T2, T3, T4.

The number of servo samples on a track determines how frequently the read/write reference clock is updated. In many situations, it is desirable to provide for more frequent updates than provided by the servo sample rate, without significantly impacting the track format efficiency (the track format efficiency is the percentage of a track used for storing data). For this purpose, optional sync field 403 may be added to the track format. Sync field 403 (FIG. 4) is positioned between data sectors 402. The auxiliary sync field 403 typically comprises AGC/timing sync field 417 and start mark 418. The spacing of the information bits within AGC/timing sync field 417, are equal to the bit spacing of the servo field within the servo sector 401, i.e., T1, used to derive the clock signal 320 from servo sector 401. Optional start mark 418 is similar to servo start mark 407, and provides an absolute position indication within sync field 403. Therefore, detection and synchronization using these sync fields is identical to that previously explained for obtaining synchronization from one or more servo fields within in servo sector. Positioning additional sync fields 403 within a data track offer opportunity in the areas of data recovery and data integrity.

Disk drive manufacturers typically provide additional pad fields 415, 416 (FIG. 4) in their track formats to assure drive controller timing signals arrive and terminate in a manner that will provide for the accurate reading of servo and data information. Conditions contributing to this uncertainty include, toggling the recording head from write to read modes or read to write modes, and spindle speed variation. As shown in FIG. 4, these fields detract from the track area that may have otherwise been used for user data. Synchronizing the write and read data clocks to the servo bit spacing reduces timing signal uncertainty, resulting in smaller timing pad fields 404, 410 within pad fields 415, 416, and improved track format efficiency.

Figure 6:
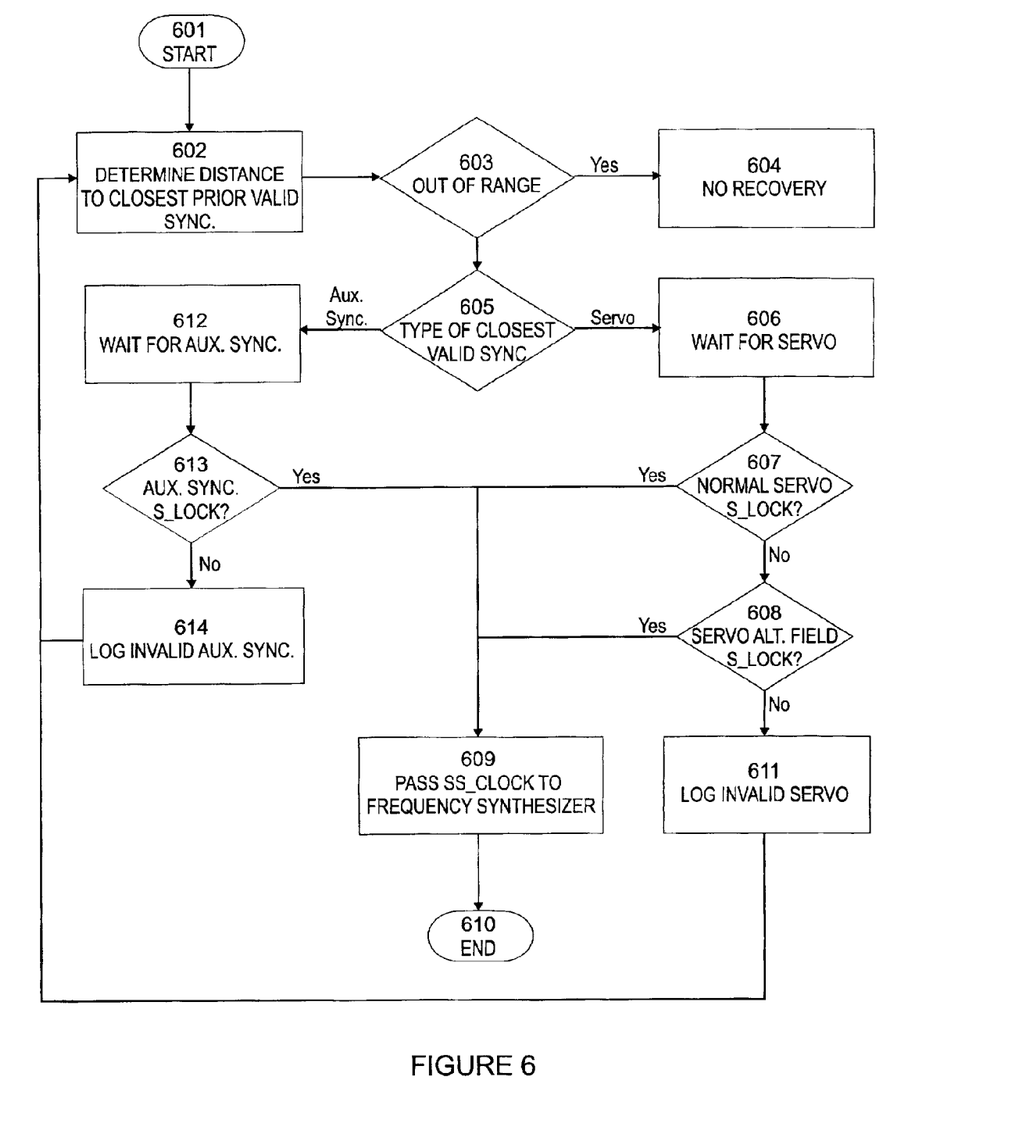
FIG. 6 depicts a clock recovery flowchart.

We have described a means for deriving a read and write reference clock from servo information and sync information in the absence of errors. A clock recovery method must be provided when the primary servo information used to establish the reference frequency is corrupt, or otherwise unavailable. General clock signal recovery procedures are depicted in FIG. 6. The flow chart assumes a track format that includes a maximum of one auxiliary synchronization sector between servo sectors, similar to the track format shown in FIG. 4. In practice, both quantity and position of these auxiliary synchronization sectors will vary.

In FIG. 6, it is assumed that the target data sector lies between servo sectors N and N+1. At step 602, the closest valid synchronization field (servo or auxiliary sync) prior to the target data sector is selected. The distance from the target data sector to the selected synchronization field is then determined. In reference to FIG. 4, for example, the target sector may data sector 402*b*, in which case servo sector 401*a* is the closest prior servo sector. At step 603 a determination is made if the distance computed at step 602 is close enough to the target data sector to allow accurate clock acquisition. If the distance is too great, at step 604 a no recovery signal is indicated. Further attempts at recovery may then be made using other techniques, such as re-tries, re-seeks, micro track offsets, etc. If the distance is acceptable, then control passes to step 605. At step 605, a determination is made if the selected sync field is an auxiliary synchronization field 403 or a servo sector 401. (If the format contains no auxiliary synchronization fields, step 605 is omitted and control passes directly to step 606.) If the selected sync field is an auxiliary sync, control passes to step 612. In reference to FIG. 4, this can occur for example when the target sector is 402*b*, and the closest prior synchronization field is auxiliary sync 403. Step 612 waits for the auxiliary sync field to come under the head. At step 613, servo VFO/PLL 312 attempts to acquire phase and frequency lock from detected data in AGC/timing sync field 417. If lock is achieved (S_LOCK 321), output SS_CLOCK 320 is valid and may be used as input to frequency synthesizer 313 at step 609. If lock is not achieved, then at step 614 the auxiliary sync field is indicated to be invalid, and control is passed back to step 602. At step 602, a new sync location will be selected, since the one just attempted was invalid. This process may involve waiting for most of a revolution for the next selected sync area to come under the head.

At step 605, if the selected sync is a servo sector, then control passes to step 606. Step 606 waits for the selected field to come under the head. At step 607, servo VFO/PLL 312 attempts to acquire phase and frequency lock from the normal servo sync field, typically detected data in AGC/timing sync field 406. If lock is achieved (S_LOCK 321), output SS_CLOCK 320 is valid and may be used as input to frequency synthesizer 313 at step 609. If lock is not achieved then AGC/timing sync field 406 is likely corrupted, but it is possible the sector servo 401 is only partially corrupted. Then at step 608, servo VFO/PLL 312 attempts to acquire phase and frequency lock from an alternate servo sync region in servo sector 401, such as detected data in PES 409. Again, if lock is achieved, then PES 409 is a non-corrupted region of servo sector 401, and control passes to step 609. If lock is not achieved, then the selected servo sector is indicated to be invalid 611, and control is passed back to step 602.

For example, the above process can be illustrated in reference to FIG. 4. Assuming the target data sector is 402d, and that a problem will be encountered with auxiliary sync field 403. At step 602, auxiliary sync field 403 will be selected. If lock is not achieved at step 613, this field 403 is corrupted and is indicated to be invalid at step 614. Now at step 602, servo sector 401a will be selected as the closest prior valid sync field. Step 606 waits for most of a revolution for servo sector 401a to come under the head. If the servo is valid, then lock will be achieved at step 607 and a valid SS_CLOCK derived at step 609.

Thus far, we have described in detail a method of deriving data clock timing using the servo information spacing contained in servo sectors and alternative synchronization regions. Conversely, it should be apparent that data clock timing might be used to establish the timing necessary for locating servo sectors, and information within servo sectors, i.e., STM, TID, and PES. This is because the data sector timing is correlated with the servo timing through the write process.

While the invention has been described as a magnetic recording disk drive, it should be apparent that it also applies to any sector servo data recording system, such as an optical recording system.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A read clock circuit for a recording disk system that has servo sectors, each of the servo sectors containing an automatic gain control (AGC) field, a position error signal (PES) field and a track identification signal (TID) field, the circuit comprising: a variable frequency oscillator/phase-locked loop (VFO/PLL) receiving a servo sector transition signal from transitions detected in a servo sector field selected from the group consisting of a PES field and a TID field and outputting a servo frequency signal that as synchronous to the servo sector transition signal, and a frequency synthesizer generating a read clock signal based on the servo frequency signal, the read clock signal being synchronous with the servo sector transition signal.

2. The read clock circuit according to claim 1, wherein the servo frequency signal is based on transitions from a plurality of servo sector fields.

3. The read clock circuit according to claim 2, wherein the servo sector transition signal includes transitions from at least one automatic gain control (AGC) field, at least one position error signal (PES) field, and at least one TID field.

4. The read clock circuit according to claim 1, wherein a phase of the read clock signal is derived from the servo frequency signal.

5. The read clock circuit according to claim 1, wherein the servo sector field is corrupted, and wherein the VFO/PLL receives the servo sector transition signal related to detected transitions in the corrupted servo sector field, the VFO/PLL outputting a servo frequency signal that is synchronous to the servo sector transition signal.

6. The read clock circuit according to claim 1 wherein the disk recording system is a data banded recording system, and wherein the frequency synthesizer generates a unique read clock signal for each data band.

7. A banded recording sector servo disk drive comprising: a data recording disk having a plurality of data bands, each data band having data recorded at a unique frequency, and a plurality of servo sectors extending in a radial direction across the bands, each of the servo sectors containing an automatic gain control (AGC) field, a position error signal (PES) field and a track identification signal (TID) field; a variable frequency oscillator/phase-locked loop (VFO/PLL) for receiving a servo sector transition signal from transitions detected in a servo sector field selected from the group consisting of a PES field and a TID field and outputting a servo frequency signal that is synchronous to the servo sector transition signal; a frequency synthesizer receiving the servo frequency signal and generating a plurality of unique read clock signals based on the servo frequency signal, the read clock signal being synchronous with the servo sector transition signal, and each unique read clock signal corresponding to a unique frequency of a data band; and a controller coupled to the frequency synthesizer and providing a data band identification signal to the frequency synthesizer.

8. The disk drive according to claim 7, wherein the servo frequency signal is based on transitions from a plurality of servo sector fields.

9. The disk drive according to claim 8, wherein the servo sector transition signal includes transitions from at least one automatic gain control (AGC) field, at least one position error signal (PES) field, and at least one TID field.

10. The disk drive according to claim 7, wherein a phase of the read clock signal is derived from the servo frequency signal.

11. The disk drive according to claim 7, wherein the servo sector field is partially corrupted, and wherein the VFO/PLL receives the servo sector transition signal related to detected transitions in the non-corrupted region of the servo sector field, the VFO/PLL outputting a servo frequency signal that is synchronous to the servo sector transition signal from the non-corrupted region.

12. The disk drive according to claim 7, wherein the nearest prior servo sector field is corrupted, and wherein the VFO/PLL receives the servo sector transition signal related to detected transitions in the next nearest prior servo sector field, the VFO/PLL outputting a servo frequency signal that is synchronous to the servo sector transition signal.

* * * * *

UNITED STATES PATENT AND TRADEMARK OFFICE
CERTIFICATE OF CORRECTION

PATENT NO.    : 6,873,483 B2
DATED         : March 29, 2005
INVENTOR(S)   : Steven R. Hetzler and William John Kabelac It is certified that error appears in the above-identified patent and that said Letters Patent is hereby corrected as shown below:

Column 7,
Line 46, change the word "as" to -- is --.

Signed and Sealed this

Thirty-first Day of May, 2005

JON W. DUDAS
*Director of the United States Patent and Trademark Office*